Patented Oct. 10, 1939

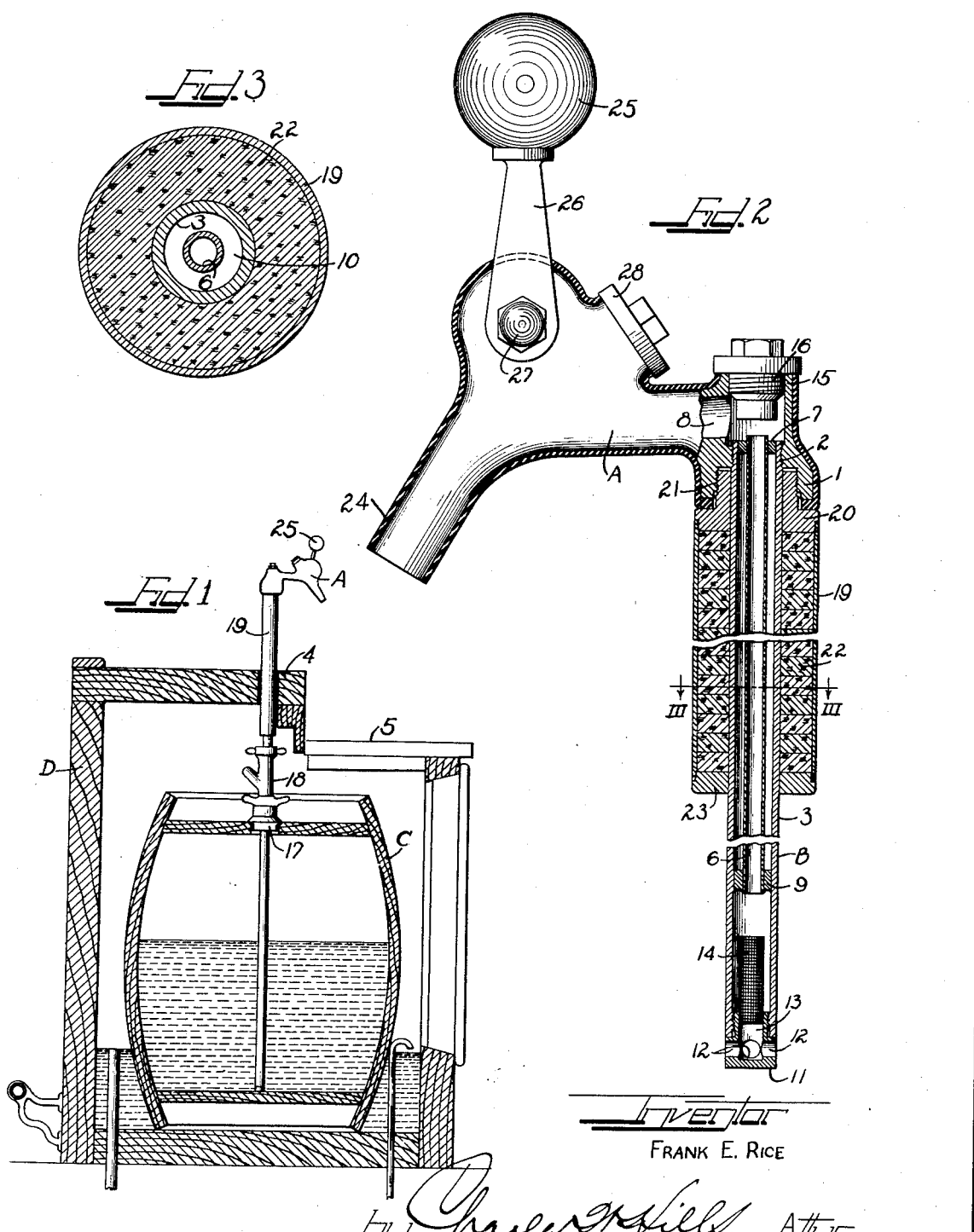

2,175,669

UNITED STATES PATENT OFFICE 2,175,669

BEER TUBE AND FAUCET CONSTRUCTION

Frank E. Rice, Detroit, Mich., assignor to American Tap-Bush Company, Detroit, Mich., a corporation of Delaware Application May 6, 1938, Serial No. 206,324

5 Claims. (Cl. 225—3)

The present invention relates to a direct tapping beer tube and faucet structure and more particularly to one which is heat insulated from adjacent the bottom of the tube to the extremity of the mouth of the nozzle of the faucet for the purpose of preventing beer, trapped in the tube and faucet between discharges, from becoming flat and warm.

The present invention is shown in connection with a beer barrel housed within a bar, in which means are provided for maintaining the beer cool by liquid surrounding the barrel and maintained by any suitable means at a proper temperature.

The present invention relates to a unit draught tube and quick acting faucet structure which may be advantageously employed for withdrawing beer directly from a barrel and discharging it in small amounts into glasses, stains or the like, and which unit structure is heat insulated.

An object of the present invention is to provide a combined draught tube and faucet structure which is heat insulated from end to end.

Another object of the present invention is to provide a combined draught tube and quick acting faucet for dispensing beer directly from a barrel, which unit structure is so constructed as to maintain the beer trapped in the tube and faucet at substantially the same temperature as the beer within the barrel, to prevent the entrapped beer from becoming flat.

Another object of the present invention is to provide a unitary draught tube and beer faucet structure wherein the tube has heat insulation provided therein, and additional insulation is provided about that portion of the tube between the barrel and the faucet.

The invention has for a further object the provision of a heat insulated faucet structure for beer dispensing devices.

A still further object of the present invention is to provide a draught tube for beer discharge which tube is heat insulated by dead air space surrounding the major portion of its length and a connected faucet is heat insulated by a covering or coating of a suitable rubber composition or other substance which may be readily molded to the faucet.

Generally speaking the draught tube is surrounded by a casing, spaced from it, the ends of the space closed, thus constituting a dead air space about the draught tube. The faucet is surrounded or enclosed within a heat insulating coating such as rubber or rubber composition, or other suitable moldable material.

The invention also contemplates an additional insulating feature surrounding that portion of the draught tube which is between the barrel and the faucet.

The above, other and further objects of the present invention will be apparent from the following description, and accompanying drawing:

The accompanying drawing illustrates an embodiment of the present invention, and the views thereof are as follows:

Figure 1 is a cross-sectional view of a bar showing a barrel confined within a cupboard or casing within the bar, with a cooling liquid surrounding the barrel and a unitary draught tube and faucet structure of the present invention inserted through a tap bush in the upper head of the barrel, the draught tube passing upwardly through an opening in the top of the bar to make available the faucet thereof for beer discharge.

Figure 2 is an enlarged fragmentary vertical sectional view through the tube structure and insulating casings showing the faucet in elevation and the faucet envelope or covering in section.

Figure 3 is an enlarged transverse sectional view taken on line III—III of Figure 2.

The unitary structure of the present invention includes a faucet A and a draught tube structure B.

The faucet is formed with a hub 1 which has a threaded aperture 2 to receive the threaded end of a casing 3 to secure the casing in position in the hub.

The casing 3 is of sufficient length to extend from adjacent the bottom of a barrel C to project upwardly above the top surface 4 of a barrel C so that the faucet A may be sufficiently far above a shelf 5 of the bar structure to enable positioning a glass, stein, pitcher or the like underneath the faucet nozzle to receive the beer discharged from it.

Within the casing 3, and spaced from its inner surface is a draught tube 6. A washer 7 surrounds the upper end of the draught tube 6 and is suitably secured to the adjacent end of the casing 3, as by soldering or otherwise. As illustrated, the upper end of the draught tube 6 projects a slight distance above the washer 7 so that beer discharged through the tube 6 may freely enter the duct 8 of the faucet.

The draught tube 6 terminates above the lower end of the casing 3 a slight distance, and at this end is surrounded by a similar washer 9. The space 10 between the draught tube 6 and the casing 3 constitutes a dead air space for heat insulation, the parts being assembled so that this space is completely shut off from the atmosphere.

A nipple 11 is threaded into the lower end of the casing 3 and is provided with lateral outlets 12 communicating with the hollow interior 13 whereby beer may enter the casing from the barrel. A screen 14 is secured to the hollow interior 13 of the nipple and extends upwardly within the casing, stopping short of the lower end of the draught tube 6. It may be observed that there are several of the openings 12 in the nipple so that the beer may have easy access to the draught tube.

The hub 1 of the faucet structure has an upwardly extending annular flange 15 which is open and interiorly threaded to receive a plug 16 for closing the opening.

Referring to Figure 1, the barrel C is provided on its upper head with a tap bush 17, of conventional form, with which cooperates a tap 18 for supporting the draught tube in position in the barrel to discharge the barrel's contents. The draught tube structure of the present invention is made of sufficient length to extend from the bottom of the barrel upwardly through the top 4 of the bar as heretofore explained.

Surrounding that portion of the casing 3, which projects above the tap 18 is a second casing 19, of considerably larger diameter than the casing 3, provided with an end member 20 centrally apertured to surround the casing 3 and exteriorly threaded to engage a threaded bored portion 21 of the hub 1 of the faucet structure to connect the casing in place.

Within the casing 19 is a column of cork discs 22, made as rings with interior diameters of such size as to tightly engage the exterior of the casing 3 and with the peripheries in tight engagement with the interior of the casing 19. The lower end of the casing 19 is closed by a threaded plug 23 engaged with the lower end of the casing, and having a central aperture to surround the casing 3. The piles of cork discs provide additional insulation for the draught tube along that portion of the tube which is between the tap 18 and the faucet A.

It is to be understood, of course, that instead of using cork discs 22 the space between the casing 3 and the casing 19 might be filled with granular cork or any other suitable insulating material.

The casing 19 may be readily removed by unscrewing it from the hub 1 of the faucet structure and pulling off the lower end of the casing 3.

The faucet A herein illustrated as of conventional type is enclosed by an insulating covering 24 of rubber, rubber composition or other suitable moldable material. The faucet A is as completely covered with this insulating material as the construction thereof admits. As illustrated the insulating covering for the faucet extends downwardly along the hub 1 of the faucet structure and inwardly so as to seal the joint between the member 20 of the casing 19 and the adjacent end of the hub.

It has been demonstrated by repeated tests, and in actual practice, that utilizing a unitary structure of the present invention, beer, which is trapped within the draught tube 6 and that portion of the faucet between the draught tube and the valve, not shown, remains for comparatively long periods of time at substantially the same temperature as the beer within the barrel 3. This means that where the discharges from the faucet are infrequent, the beer, at every discharge, is cool, is not flat, and because of the fact that it remains cool, excessive foam formation is prevented.

Such demonstrations have been made without any spitting from the nozzle of the faucet as the valve is opened, after comparatively long intervals of time between discharges.

The diameter of the draught tube 6 is such as to equalize pressure conditions existing in the barrel so that beer is not discharged under such high pressure as to cause it to spill out of the glass held at the nozzle of the faucet.

The faucet structure of the present invention may be of the general character described in applicant's co-pending application, Serial No. 185,257, filed January 17, 1938.

The faucet A is shown as provided with the usual ball handle 25 attached to a lever 26 which in turn is secured to a shaft by means of a nut 27 for opening and closing the valve with respect to its seat. A nut 28 normally closes an opening in the faucet structure in line with the valve and through this opening the valve may be removed and replaced for maintenance and repair purposes. The nut 28 is not illustrated as being heat insulated as it has been found in practice the faucet is sufficiently insulated by the rubber covering applied to it as described.

The parts may be cleaned easily, as the tube structure B may be removed from the faucet structure A. The draught tube may be cleaned by removing the plug 16 and nipple 11 and running a brush through the tube.

The invention has been described herein more or less precisely as to details, yet it is to be understood that the invention is not to be limited thereby as changes may be made in the arrangement and proportion of parts and equivalents may be substituted without departing from the spirit and scope of the invention.

The invention is claimed as follows:

1. A beer draught device comprising a unitary draught tube and faucet structure, said tube structure comprising inner and outer co-axial pipes providing a dead air space between them for heat insulation and said faucet being enclosed by heat insulating material.

2. A beer faucet having its exterior covered by a rubber coating for heat insulation.

3. A direct tapping draught tube and faucet structure including a tube heat insulated from end to end, and a faucet having a protective covering of material having heat insulating characteristics.

4. A direct tapping draught tube and faucet structure including a tube heat insulated from end to end, and a faucet having a protective covering of material having heat insulating characteristics, and additional heat insulating means about said tube applied to that portion thereof which extends above a tap when said tube is connected to a barrel.

5. In a device of the class described, in combination, a rubber coated faucet, a draught tube enclosed within a casing providing a dead air space therebetween for insulation purposes, and an additional casing surrounding said first casing in spaced relation to the same and filled with heat insulating material.

FRANK E. RICE.